United States Patent
Li et al.

(10) Patent No.: US 12,262,433 B2
(45) Date of Patent: Mar. 25, 2025

(54) SYSTEMS AND METHODS FOR MULTI-NODE COMMUNICATION IN WIRELESS COMMUNICATION NETWORKS

(71) Applicant: ZTE Corporation, Guangdong (CN)

(72) Inventors: Nan Li, Guangdong (CN); Zhiqiang Han, Guangdong (CN); Bo Sun, Guangdong (CN); Dan Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 390 days.

(21) Appl. No.: 17/847,484

(22) Filed: Jun. 23, 2022

(65) Prior Publication Data
US 2022/0322476 A1    Oct. 6, 2022

Related U.S. Application Data

(63) Continuation of application No. PCT/CN2019/127582, filed on Dec. 23, 2019.

(51) Int. Cl.
*H04W 76/15* (2018.01)
*H04B 7/024* (2017.01)
(Continued)

(52) U.S. Cl.
CPC .......... *H04W 76/15* (2018.02); *H04B 7/024* (2013.01); *H04L 5/0048* (2013.01); *H04W 72/0453* (2013.01); *H04W 72/569* (2023.01)

(58) Field of Classification Search
CPC ............ H04W 76/15; H04W 72/0453; H04W 72/569; H04W 76/11; H04W 92/20; H04B 7/024; H04L 5/0048
See application file for complete search history.

(56) References Cited

U.S. PATENT DOCUMENTS

| 10,070,383 B2 | 9/2018 | Fwu et al. |
| 10,110,282 B2 | 10/2018 | Zhang et al. |

(Continued)

FOREIGN PATENT DOCUMENTS

| CN | 103828254 A | 5/2014 |
| CN | 104904292 A | 9/2015 |

(Continued)

OTHER PUBLICATIONS

European Search Report for EP Patent Application No. 19952271.5, dated Nov. 16, 2022, 15 pages.

(Continued)

*Primary Examiner* — Sudesh M Patidar
(74) *Attorney, Agent, or Firm* — Perkins Coie LLP (57) ABSTRACT

A systems and methods for multi-node communication between wireless communication nodes and a single wireless communication device are disclosed herein. In one embodiment, the systems and methods are configured to receive, by a second wireless communication node from a first wireless communication node, a notification frame. The systems and methods can be further configured to perform joint transmission, by the second wireless communication node to a wireless communication device according to the notification frame received from the first wireless communication node. The systems and methods can also be configured to suspend, by the second wireless communication node, contention parameters of the second wireless communication node at the beginning of the transmission to the wireless communication device.

18 Claims, 6 Drawing Sheets

(51) Int. Cl.
  *H04L 5/00* (2006.01)
  *H04W 72/0453* (2023.01)
  *H04W 72/566* (2023.01)

(56) References Cited

U.S. PATENT DOCUMENTS

| | | | |
|---|---|---|---|
| 10,305,550 | B2 | 5/2019 | Wang et al. |
| 10,893,539 | B2 | 1/2021 | Baron et al. |
| 2005/0180449 | A1 | 8/2005 | Ranta-Aho et al. |
| 2010/0173660 | A1* | 7/2010 | Liu ................ H04W 48/16 455/501 |
| 2013/0017833 | A1 | 1/2013 | Sakamoto et al. |
| 2016/0037511 | A1* | 2/2016 | Vincze ............. H04W 72/27 370/329 |
| 2017/0171773 | A1 | 6/2017 | Cariou et al. |
| 2017/0332405 | A1 | 11/2017 | Son et al. |
| 2018/0014246 | A1 | 1/2018 | Chang |
| 2018/0035393 | A1* | 2/2018 | Kazmi ............. H04W 52/346 |
| 2019/0191456 | A1* | 6/2019 | Koorapaty ...... H04W 74/0808 |
| 2019/0273534 | A1* | 9/2019 | Wang ................ H04B 7/024 |
| 2020/0106579 | A1* | 4/2020 | Cherian ............ H04B 17/318 |
| 2020/0187186 | A1 | 6/2020 | Li et al. |
| 2021/0051721 | A1* | 2/2021 | Baron .............. H04W 28/0268 |
| 2021/0391897 | A1* | 12/2021 | Wang ................ H04B 7/024 |

FOREIGN PATENT DOCUMENTS

| | | |
|---|---|---|
| CN | 107819546 A | 3/2018 |
| CN | 109413672 A | 3/2019 |
| CN | 109845381 A | 6/2019 |
| CN | 109889238 A | 6/2019 |
| WO | 2014074919 A1 | 5/2014 |
| WO | 2016109921 A1 | 7/2016 |
| WO | 2016144216 A1 | 9/2016 |
| WO | 2017065561 A1 | 4/2017 |

OTHER PUBLICATIONS

Camps-Mur et al., "Enabling Always On Service Discovery: WiFi Neighbor Awareness Networking," IEEE Wireless Communications, Coordinated Science Laboratory, Department Electrical and Computer Engineering, University of Illinois at Urbana-Champaign, US, vol. 22, No. 2, Apr. 1, 2015, pp. 118-125, XP011579866, 8 pages.

International Search Report and Written Opinion mailed on Sep. 18, 2020 for International Application No. PCT/CN2019/127582, filed on Dec. 23, 2019 (9 pages).

Chinese office action issued in CN Patent Application No. 201980102706.X, dated Jun. 13, 2024, 18 pages. English translation included.

Chinese Notification to Complete Formalities of Registration issued in CN Patent Application No. 201980102706.X, dated Oct. 24, 2024, 6 pages. English translation included.

European Communication pursuant to Article 94(3) EPC issued in EP Patent Application No. 19952271.5, dated Nov. 29, 2024, 6 pages.

\* cited by examiner

Figure 8

SYSTEMS AND METHODS FOR MULTI-NODE COMMUNICATION IN WIRELESS COMMUNICATION NETWORKS

CROSS-REFERENCE TO RELATED APPLICATIONS

This application is a continuation of International Patent Application No. PCT/CN2019/127582, filed on Dec. 23, 2019, the contents of which are incorporated herein by reference in their entirety.

TECHNICAL FIELD

The disclosure relates generally to wireless communications and, more particularly, to systems and methods for communication between multiple nodes in wireless communication networks.

BACKGROUND

Wireless communication networks can include network communication devices and network communication nodes. In some instances, the network communication devices can receive communication signals from more than one network communication nodes.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, by a second wireless communication node from a first wireless communication node, a notification frame. The method further includes performing joint transmission, by the second wireless communication node to a wireless communication device according to the notification frame received from the first wireless communication node. The method also includes suspending, by the second wireless communication node, contention parameters of the second wireless communication node at the beginning of the transmission to the wireless communication device.

In another embodiment, a method includes receiving, by a first wireless communication node from a second wireless communication node, an indication that the second wireless communication node supports a joint transmission to a wireless communication device. The method further includes transmitting, by a first wireless communication node to a second wireless communication node, a notification frame. The method also includes transmitting, by the first wireless communication node to the second wireless communication node, data to be transmitted to a wireless communication device. The method further includes performing joint transmission, by the first wireless communication node, of the data to the wireless communication device.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
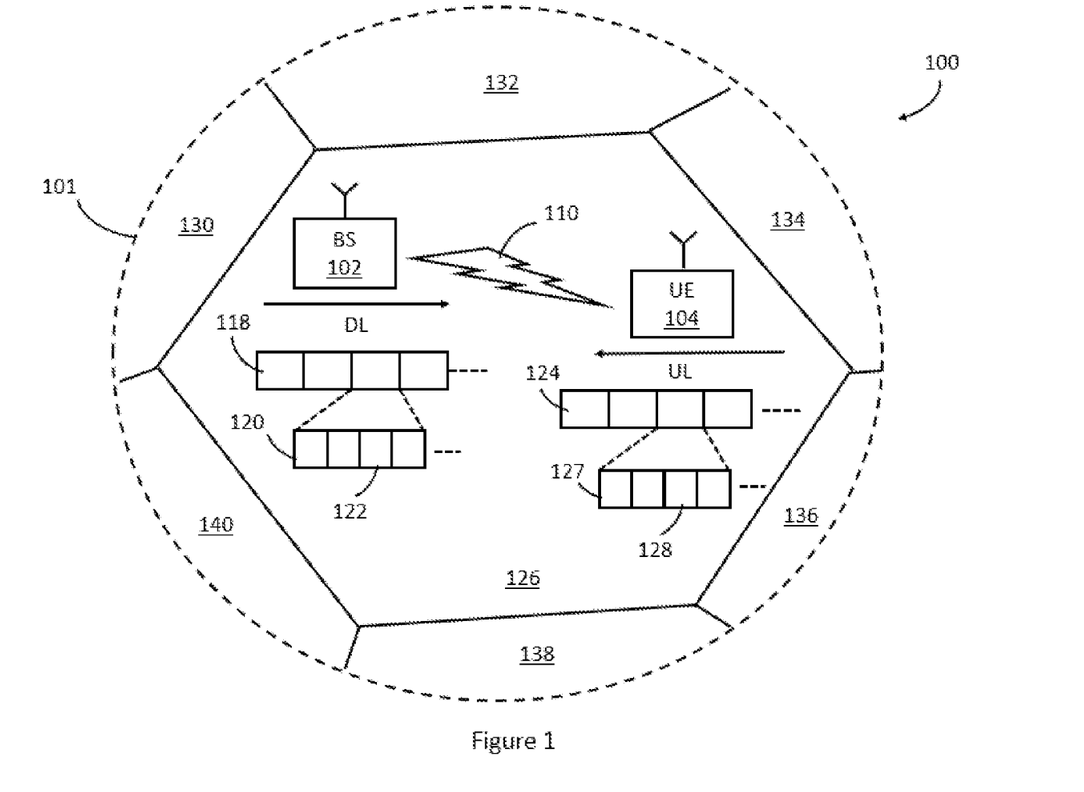
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (also referred to as "communication point 102" or "BS 102" or "transmitting receiving point (TRP)", or "communication node") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the communication point 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the communication point 102 may operate at an allocated channel transmission bandwidth to provide adequate coverage to the UE 104. The communication point 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the communication point 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
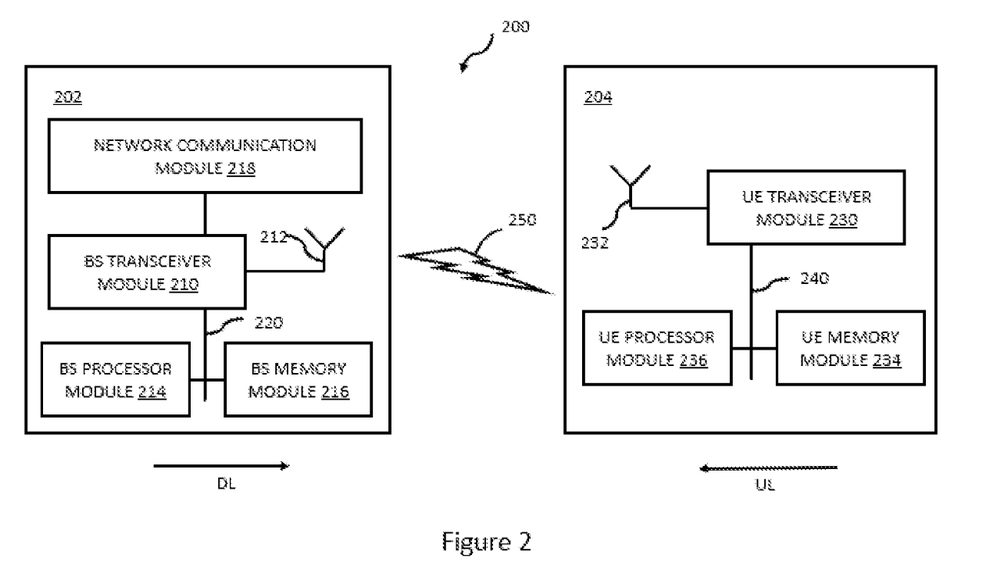
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (also referred to as "communication point 202") and a user equipment device 204 (hereinafter "UE 204"). The communication point 202 includes a the communication point (base station) transceiver module 210, a communication point antenna 212, a communication point processor module 214, a communication point memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The communication point 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the communication point transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the communication point 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

In wireless networks, such as, for example, wireless local area networks (WLANs), devices that can connect to the wireless network are referred to as stations (STAs). Some stations can act as base stations and are referred to as access points (APs). A basic service set (BSS) is a set of all stations that can communicate with each other over a physical layer of the wireless network. For example, an AP can establish a BSS including an STA, where an STA can communicate with the AP and other STAs in the BSS. Generally, an STA is associated with a single AP at a time. The associated AP can store information related to the STA, such as, for example, an assigned association ID (AID) of the STA, a key, data packet sequence numbers, established traffic flow identifier, block acknowledgement protocol related information, etc. The STA can communicate with other STAs via the AP, or after establishing direct link communication with other STAs, can directly communicate with those STAs. For example, in some WLANs, such as independent BSS (IBSS), there is no AP, and the STAs can establish an ad hoc communication network.

As discussed herein, more than one AP can communicate with the same STA at a time. The multiple APs can communicate the same data to the STA, thereby improving the reliability of data transfer to the STA.

Figure 3:
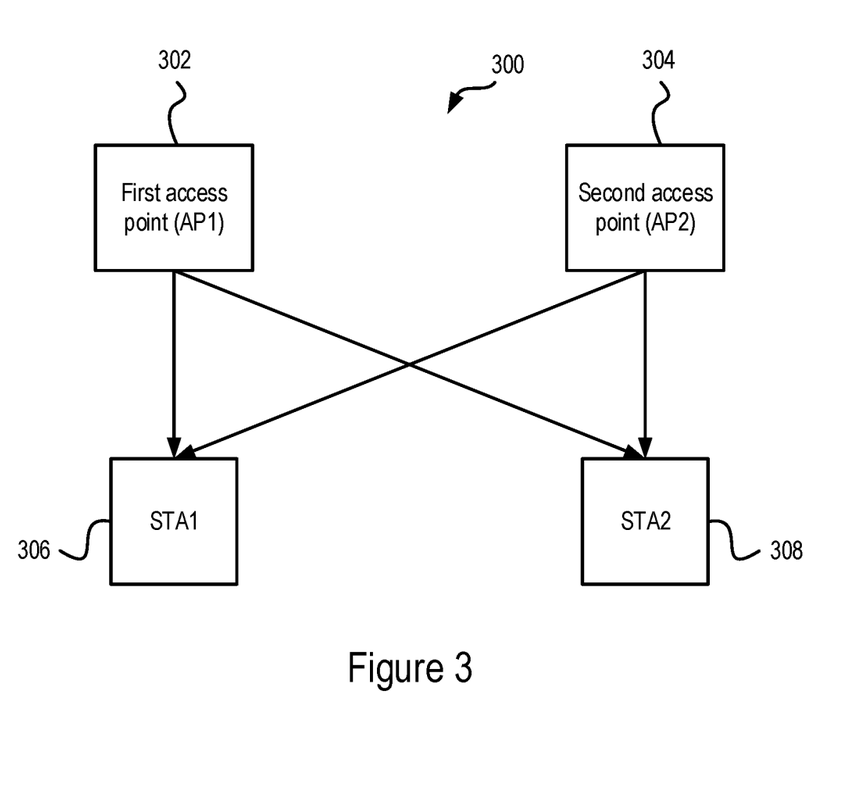
FIG. 3 shows an example communication system including a first access point (AP1), a second access point (AP2), a first station (STA1), and a second station (STA2), in accordance with some embodiments of the present disclosure.

FIG. 3 shows an example communication system 300 including a first access point ("AP1") 302 (also referred to as "a first wireless communication node"), a second access point ("AP2") 304 (also referred to as "a second wireless communication node"), a first STA ("STA1") 306 (also referred to as "a first wireless communication device" or "a wireless communication device"), and a second STA ("STA2") 308 (also referred to as "a second wireless communication device" or "a wireless communication device"). In some embodiments, the AP1 302 and the AP2 304 can be base stations discussed above in relation to FIGS. 1 and 2. In some embodiments, the STA1 306 and the STA2 308 can be UEs discussed above in relation to FIGS. 1 and 2.

Unlike traditional communication systems, where each STA communicates with a single AP at a time, in the example communication system 300 shown in FIG. 3, both the AP1 302 and the AP2 304 can communicate with any one of the STA1 306 or the STA2 308 at the same time. For example, both the AP1 302 and the AP2 304 can communicate data to the STA1 306 at the same time. Alternatively, both the AP1 302 and the AP2 304 can communicate data to the STA2 308 at the same time. To carry out communication in this manner, the AP1 302 and the AP2 304 can exchange information including, for example, the timing of the transmission from each of the AP1 302 and the AP2 304 such that the data transmitted from each access point reaches the STA1 306 (or the STA2 308) at the same time. The exchange of information between the AP1 302 and the AP2 304 can be carried out by the AP1 302 and the AP304, or by a third entity that can provide the information to the AP1 302 and the AP2 304.

Figure 4:
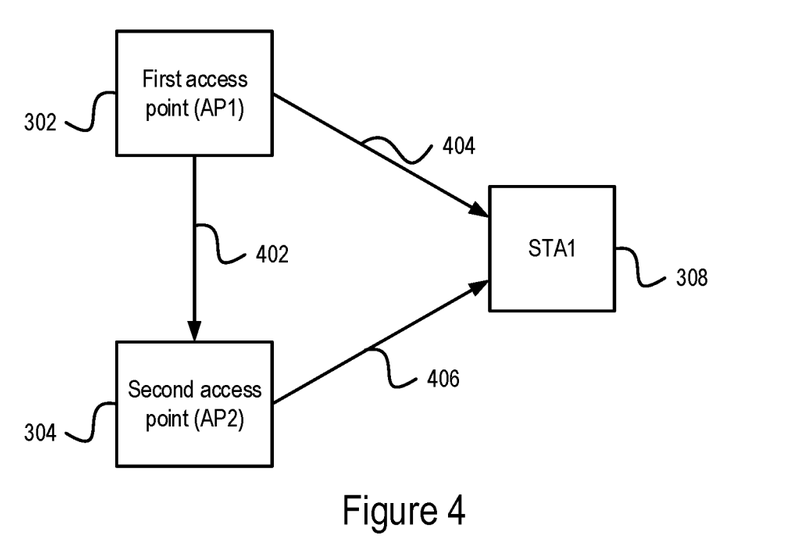
FIG. 4 shows a first example scenario in which two access points can communicate with the same station and information exchange is carried out by the two access points, in accordance with some embodiments of the present disclosure.

FIG. 4 shows a first example scenario in which two access points can communicate with the same station and information exchange is carried out by the two access points. In particular, FIG. 4 shows the AP1 302 and the AP2 304 establishing communication with the same station, the STA1 306. In this first example scenario, the AP1 302 and the AP2 304 can exchange information prior to communicating with the same station, the STA1 306. For example, the AP1 302 can communicate transmission start time information to the AP2 304 via a notification frame 402. The AP2 304 can then adjust its transmission timing based at least on the start time information provided by the AP1 302 and the estimated transmission time to the STA1 306 such that the transmissions from both the AP1 302 (first data transmission 404) and the AP2 304 (second data transmission 406) arrive at the STA1 306 at the same time. In some embodiments, the AP1 302 can also send to the AP2 304 the data to be transmitted to the STA1 306 prior to the start time of data transmission to the STA1 306.

Figure 5:
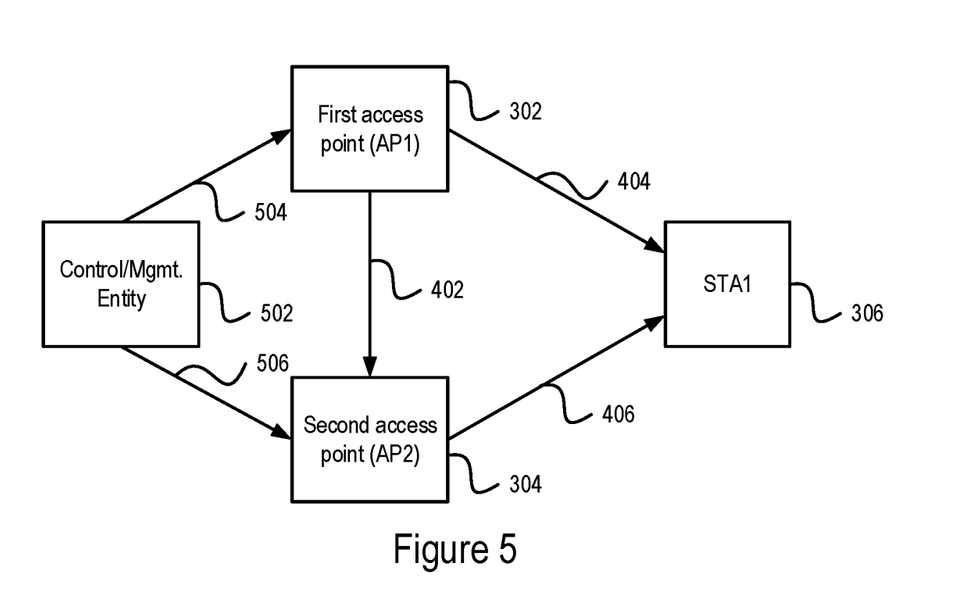
FIG. 5 shows a second example scenario in which two access points can communicate with the same station and timing information is provided by a control/management entity, in accordance with some embodiments of the present disclosure.

FIG. 5 shows a second example scenario in which two access points can communicate with the same station and timing information is provided by a control/management entity. In particular, FIG. 5 shows a control/management entity 502 in communication with the AP1 302 and the AP2 304. The control/management entity 502 can send a first timing information 504 to the AP1 302 and a second timing information 506 to the AP2 304. The first timing information 502 and the second timing information 504 includes the start times for transmission by the AP1 302 and the AP2 304, respectively, to the STA1 306. Upon receiving their respective timing information, the AP1 302 and the AP2 304 can start data transmission to the STA1 306 based on the received timing information such that the data arrives at the STA1 306 at the same time. In some embodiments, the control/management entity 502 can also provide the data to be transmitted to the STA1 306 in addition to the timing information to the AP1 302 and the AP2 304. Alternatively, the AP1 302 can transmit to the AP2 304 the data to be transmitted to the STA1 306 prior to the start time of data transmission.

The AP1 302 can declare or specify its capability of supporting multi-node transmission. In particular, the AP1 302 can declare or specify at least a set of frequency bands or channels that supports multi-node transmission. Generally, multi-node transmission mode can include at least one of a joint transmission mode, a selective transmission mode, or a coordination transmission mode. Joint transmission mode includes at least two wireless communication nodes sending data to the same wireless communication device at the same time. In selective transmission mode, at a given time, only one of the communication nodes can transmit data to the same wireless communication device. In coordination transmission mode, coordinated orthogonal frequency division multiple access (OFDMA) cooperative frequency multiplexing, or coordinated spatial reuse can be used to allow the wireless communication nodes to transmit data to the same wireless communication device at the same time, albeit, over different frequency bands or channels.

In some embodiments, the AP1 302 and the AP2 304 can negotiate a transmission mode for multi-node transmission to the STA1 306. For example, the AP1 302 and the AP2 304 can exchange information regarding their respectively supported multi-node transmission mode (e.g., joint transmission mode, selective transmission mode, or coordination transmission mode). Thereafter, the AP1 302 and the AP2 304 can select a mutually agreeable multi-node transmission mode. The negotiation for selection of the multi-node transmission mode is carried out by the wireless communication nodes prior to the time for data transmission to the wireless communication device. As an example, the AP1 302 and the AP2 304 can set a period of time, prior to the data transmission to the STA1 306, during which the AP1 302 and the AP2 304 can negotiate to select a multi-node transmission mode. In some embodiments, during negotiations, in addition to selecting the multi-node transmission mode, the AP1 302 and the AP2 304 can exchange the mutually agreeable frequency band or channel for data transmission to the STA1 306.

In some embodiments, the AP2 304, for example, can declare support for a joint transmission mode. In response, the AP1 302 can obtain from the AP2 304 joint transmission mode capability information. The capability information can include, for example, at least one of a data buffering capacity of the AP2 304, an access category or priority of buffered data supported by the AP2 304, or traffic identification information. As mentioned above, the AP1 302 can send data to the AP2 304 for multi-node transmission to the STA1 306. Thus, the AP2 304 has to store or buffer the data prior to the transmission to the STA1 306. The AP2 304 sends its data buffering capacity to the AP1 302 to enable AP1 302 to determine whether the AP2 304 is capable of storing and then subsequently transmitting the data to the STA1 306. Access category or priority of buffered data can refer to the access categories that correspond to levels of priorities that the AP2 304 can support for transmitting data for the AP1 302. The AP2 304, for example, can announce that data related to two access categories (e.g. AC-VI and AC-VO) could be transmitted by AP2 304. The AP1 302 can determine that the AP2 304 is capable of carrying out multi-node transmission if access category or priority of its data matches the access categories or priority information received from the AP2 304. Traffic identification information can be used to classify a packet that carries data between the two wireless communication nodes. The AP1 302 can use the traffic identification information received from the AP2 304 to select data packets and transmit the data packets to the AP2 304.

The AP1 302, based on the joint transmission mode capability information received from the AP2 304, can send data to the AP2 304 for eventual transmission to the STA1 306. The AP1 302 also can send a notification frame to the AP2 304, where the notification frame can include at least one of a start time, an identifier of the STA1 306, one or more traffic identifier of the data packets to be transmitted, and sequence numbers of the data packets to be transmitted. The start time can specify the time when the AP1 302 will start transmitting data to the STA1 306. In some embodiments, the start time can specify the start time at which the AP2 304 should start transmitting data to the STA1 306. In some embodiments, the start times of the AP1 302 and the AP2 304 can differ based on the transmission delay between the respective AP1 302 and AP2 304 and the STA1 306. The traffic identifier can identify a traffic flow, which has been established to transmit data related to a set of QoS parameters between two devices. The identifier of the STA1 306 can be, for example, a MAC address of the STA1 302, or any other unique identifier associated with the STA1 306. The sequence numbers can specify the sequence numbers of the data packets that the AP2 should select from the buffer to be sent to the STA1 306. The AP2 304 can utilize the information in the notification frame to select the data packets to be transmitted to the STA1 306 and transmit the data packets at the start time specified (or a start time derived from the start time specified) in the notification frame.

As mentioned above, the AP2 can declare its capability of supporting multi-node transmission. Also, the AP2 can declare or specify at least a set of frequency bands or channels that supports multi-node transmission. The AP2 304 can carry out negotiations with the AP1 302 to determine a mutually agreeable multi-node transmission mode. Once the mutually agreeable multi-node transmission mode is selected, the AP2 304 can transmit its capability information, discussed above, to the AP1 302. The AP2 can receive a notification frame and the data to be transmitted from the AP1 302. Based on the information in the notification frame, and the data, the AP2 304 can select the data packets for transmission from its buffer, and transmit the data packets to the STA1 306 at the start time.

Figure 6:
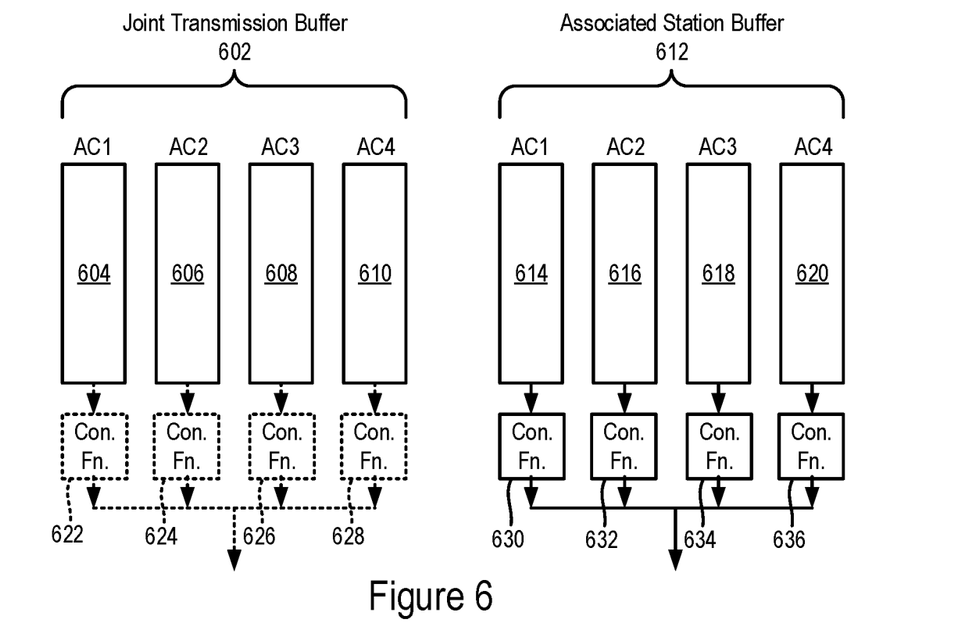
FIG. 6 shows a first example buffer configuration of the second wireless transmission node, in accordance with some embodiments of the present disclosure.

FIG. 6 shows a first example buffer configuration of the second wireless transmission node. In particular, FIG. 6 shows a buffer configuration in which the AP2 304 buffers data received from the AP1 302 into a joint transmission buffer 602 that includes separate queues for four separate access categories. In some embodiments, the AP2 304 can receive data from APs other than the AP1 302. In such instances, the AP2 304 can include an identity of the source AP with the data when the data is stored in the joint transmission buffer 602. With regard to the access categories, as an example, the joint transmission buffer 602 includes a first access category queue 604, a second access category queue 606, a third access category queue 608 and a fourth access category queue 610. The AP2 304 also includes an associated station buffer 612, which stores data to be transmitted to stations (e.g., STA2 308, FIG. 3) that are associated with the AP2 304. The associated station buffer 612 can also include four access category queues, such as for example, a first access category queue 614, a second access category queue 616, a third access category queue 618 and a fourth access category queue 620. Each access category queue also has a contention/congestion function. For example, the four access category queues of the joint transmission buffer 602 have four contention/congestion functions 622, 624, 626, and 628. Similarly, the four access category queues of associated station buffer 612 have four contention/congestion functions 630, 632, 634, and 636. In some embodiments, the contention/congestion function for the transmission buffer 602 may be invoked only when the AP2 304 implements a channel contention procedure before transmitting data to the STA1 306.

Generally, a WLAN non-AP station or access point, such as for example, the AP2 304 maps incoming data packets to the appropriate access category queue based on the priority of the data packets. A station may have multiple traffic flows at the same time, and for different traffic flows, the data packets can have different priority attributes. The AP2 304 can map the incoming data packets to the appropriate access category queue based on the priority of the data packet. Each access category has an associated set of enhanced distributed channel access (EDCA) parameters. The station or access point uses these parameters for transmission media competition and data packet transmission. In particular, the transmission over the wireless medium is generally carried out based on carrier sense multiple access with collision avoidance (CSMA/CA) protocols. The contention/congestion functions of each access category queue determine whether the medium is idle to transmit the data packets in the associated queue.

The contention/congestion functions can employ at least the following EDCA parameters: AIFSN (arbitration interframe space number), TXOP (transmission opportunity) limit, CWmax (contention window-max), CWmin (contention window-min). AIFSN indicates the number of slots after a SIFS (short interframe space) a STA defers before either invoking a backoff or starting a transmission. The TXOP limit defines the maximum length of medium time that the transmission opportunity is occupied. CWmax and CWmin define the maximum and minimum size of the contention window before starting transmission. Contention parameters at least includes contention window and backoff counter. The contention window can be assigned an initial value of CWmin, and can be incremented each time a transmission fails, until the value of the contention window reaches CWmax. A value of backoff counter can be randomly selected between zero and the value of contention window. In instances where the parameters are employed, the contention/congestion function of each access category queue, after detecting the medium idle for an AIFS (arbitration interframe space) time period, starts decrementing its backoff counter. When the backoff counter reaches zero, the contention/congestion function can start transmission of data packets from the associated access category queue. Access categories with shorter AIFS have higher probability of transmission in the next transmission frame.

Figure 7:
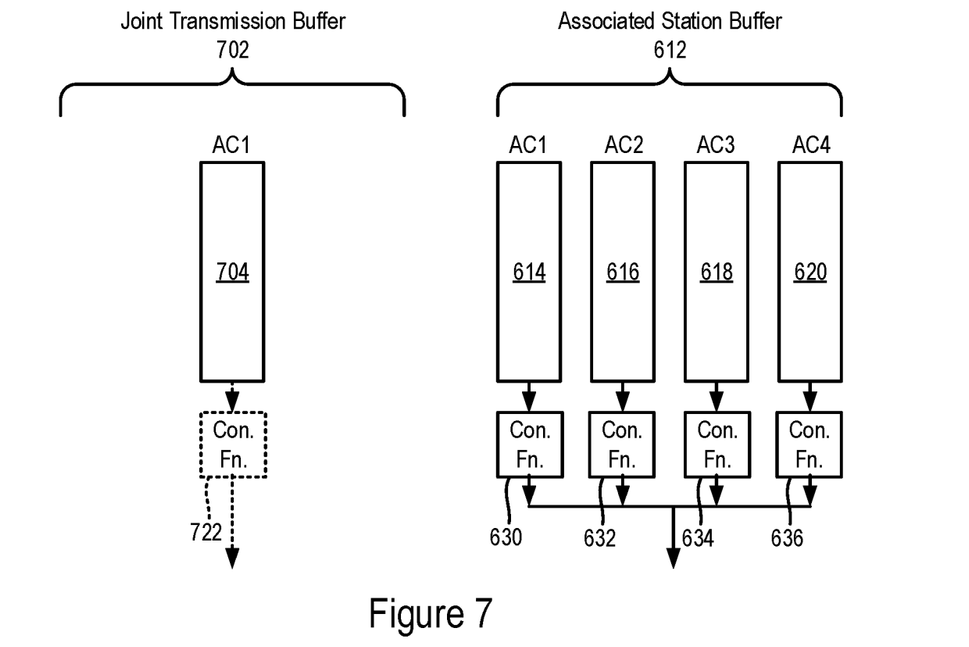
FIG. 7 shows a second example buffer configuration of the second wireless transmission node, in accordance with some embodiments of the present disclosure.

FIG. 7 shows a second example buffer configuration of the second wireless transmission node. In particular, FIG. 7 shows a buffer configuration in which the AP2 304 buffers data received from the AC1 302 into a joint transmission buffer 702 that includes a single access category queue 704. In contrast with the joint transmission buffer 602 shown in FIG. 6, the joint transmission buffer 702 in FIG. 7 utilizes a single access category queue 704 and a single contention/configuration function 722 associated with the access category queue 702. This means that the data packets received from the AP1 302 are mapped into a single access category queue regardless of the traffic flow or priority associated with the data packets. In some embodiments, the AP2 304 can receive data from APs other than the AP1 302. In such instances, the AP2 304 can include an identity of the source AP with the data when the data is stored in the joint transmission buffer 702. In some embodiments, the data packets in the access category queue 702 are transmitted in a first-in-first-out manner. The contention/congestion function 722 functions in a manner similar to that discussed above in relation to the contention/congestion functions 622, 624, 626, and 628. Specifically, the contention/congestion function 722 can maintain EDCA parameters such as AIFSN, TXOP limit, CWmax and CWmin do determine when to transmit data packets in the access category queue 704. The associated station buffer 612 is similar to that discussed above in relation to FIG. 6 In some embodiments, the contention/congestion function for the transmission buffer 702 may be invoked only when the AP2 304 implements a channel contention procedure before transmitting data to the STA1 306.

After receiving notification frame from the AP1 302, optionally, the AP2 304 senses the channel, which means the AP2 304 will perform transmission to the STA1 306 at the start time if the channel has been idle for predefined interval, such as PIFS (point coordination function interframe space) or AIFS of the corresponding access category of the data before the start time. In some embodiments, the AP2 304 can perform data transmission at the start time regardless of whether the channel's idle/busy status.

At the start of joint transmission, the AP2 304 can suspend the contention parameters associated with the four access category of its associated STAs at the beginning of the transmission of data to the STA1 306. In particular, at the time of data transmission, based on the start time specified in the notification frame received from the AP1 302, the AP2 304 can suspend the contention parameters associated with each of the first, second, third, and fourth queues 614, 616, 618, and 620 of the transmission buffer 612. Similarly, if the configuration shown in FIG. 7 is utilized, the AP2 304 can suspend the contention parameters associated with the four access category of its associated STAs at the beginning of the transmission of data to the STA1 306. The aim to suspending the values of the contention parameters of the AP2 304 is to retain the current contention status of the AP2

304 during the joint transmission to the STA1 306, which is not the associated STA of AP2.

Figure 8:
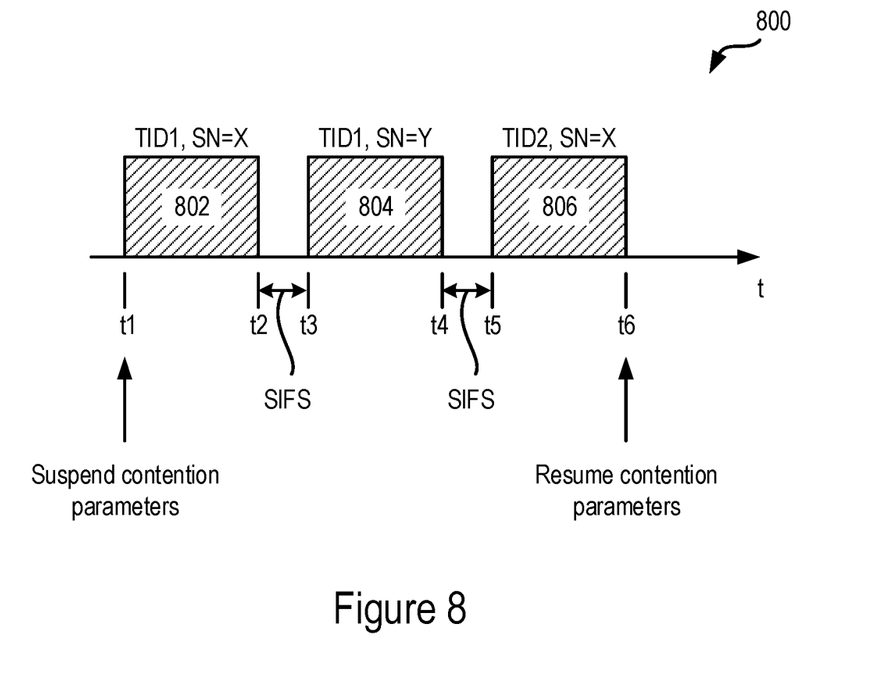
FIG. 8 shows a timing diagram of an example data transmission sequence of data transmitted by the second wireless communication node during joint transmission mode, in accordance with some embodiments of the present disclosure.

FIG. 8 shows a timing diagram 800 of an example data transmission sequence of data transmitted by the second wireless communication node during joint transmission mode. In particular, FIG. 8 shows a timing diagram of an example data transmission sequence from the AP2 304 to the STA1 306. The timing diagram 800 shows the transmission of three data packets, a first data packet 802, a second data packet 804, and a third data packet 806 from the AP2 304 to the STA1 306. While the timing diagram 800 shows only three data packets, it is understood that this is not limiting, and that specific limitations can transmit fewer than or greater than the three data packets shown in FIG. 8. The joint transmission of data from the AP2 304 begins at time t1. At this time, the AP2 304 begins the transmission of the first data packet 802. At the end of the transmission of the first data packet at time t2, the AP2 304 introduces a time interval, short interframe space (SIFS), before the transmission of the second data packet 804 at time t3. Again, at the end of the transmission of the second data packet 804 at time t4, the AP2 304 introduces a time interval SIFS before beginning the transmission of the third data packet 806 at time t5. The joint data transmission ends with the completion of the transmission of the third data packet 806 at time t6. The SIFS can represent the time needed by the AP2 304 to process a received data packet and transmit the data packet over the physical medium. The magnitude of the SIFS time interval can be a function of a delay in the receiver, a delay in the transmitter, and a MAC processing delay, which depends on the physical layer used. As an example, the value of SIFS can be equal to 16 microseconds.

At time t1 (the start time of joint data transmission), the AP2 304 suspends the contention parameters of the four AC of its associated STAs. For example, the AP2 304 can suspend the contention parameters such as the current value of CW, and the backoff counter associated with the four access categories. Specifically, taking one of access category in the associated station buffer 612 as an example, the contention function of the access category can be performing backoff before time t1. At time t1, the value of the contention window (CW) can be equal to m, and the value of the backoff counter can be equal to n. The AP2 304 can suspend or keep constant the values of CW and the backoff counter to the values at time t1 throughout the duration of joint data transmission to the STA1 306 (i.e., until time t6). At the end of the joint data transmission, the AP2 304 can resume to decrement the backoff counter when AP2 304 detects that the physical channel is idle. As the contention parameters for the access categories in the associated station buffer 612 were suspended during the joint transmission, the contention status of the AP2 304 for the associated buffer 612 at the end of the joint transmission is the same as the contention status at the start time of the joint transmission. In this manner, the contention status of the AP2 304 is retained during the period of joint data transmission to the STA1 306. It should be noted that AP2 304 does not reset the value of CW to CWmin or increment the value of CW at time t6, due to the success or failure of the data transmission to the STA1 306.

The AP2 304 can transmit the first, second, and the third data packets 802, 804, and 806 with traffic flow identifiers and sequence numbers based on those received in the notification frame from the AP1 302. For example, the AP2 304 receives an identifier of STA1 306, and the traffic identifier TID1 for both the first data packet 802 and the second data packet 804, and the sequence numbers X and Y for the first data packet 802 and the second data packet 804, respectively. Further, the AP2 304 receives the traffic identifier TID2 and a sequence number X for the third data packet 806. Thus, the AP2 304 selects from the joint transmission buffer (e.g., joint transmission buffer 602 or 702) the data packets with the specified traffic identifiers and the specified sequence numbers, and transmits the first data packet 802 with the flow identifier TID1 and sequence number X, the transmits the second data packet 804 with the flow identifier TID1 and sequence number Y, and transmits the third data packet 806 with the flow identifier TID2 and sequence number X. It should be noted that the flow identifiers and the sequence numbers shown in FIG. 8 are only examples, and that other implementations can have different flow identifiers and sequence numbers.

In some implementations, AP1 302 also transmits the first data packet 302, the second data packet 304, and the third data packet 306 with the same timing characteristics as those discussed above in relation to the AP2 304. The AP1 302 may also transmit the data packets with the same flow identifiers and sequence numbers as those used by the AP2 304. The content of the data packets transmitted by the AP1 302 can be the same as the content of the data packets transmitted by the AP2 304. In this manner, the data transmitted by both the first AP1 302 and the second AP2 304 arrives at the STA1 306 at the same time. This improves the signal strength of the data received at the STA1 306, and thereby improves the reliability of the data received at the STA1 306.

While the above discussion shows joint data transmission using two access points, it is understood that more than two access points can be used to carry out joint transmissions. In such instances, the AP1 302 can negotiate the joint transmission mode with more than one other access points, and send notification frames to each of the more than one access points. The more than two access points (including the AP1 302) can then begin joint data transmission at their respective start times such that the data from each of the more than two access points arrives at the STA1 306 at the same time.

In one embodiment, a method includes receiving, by a second wireless communication node from a first wireless communication node, a notification frame. The method further includes performing joint transmission, by the second wireless communication node to a wireless communication device according to the notification frame received from the first wireless communication node. The method also includes suspending, by the second wireless communication node, contention parameters of the second wireless communication node at the beginning of the transmission to the wireless communication device.

In some embodiments, the method also includes before performing joint transmission, transmitting, by the second wireless communication node to at least the first wireless communication node, capability information of the second wireless communication node for joint transmission. In some embodiments, the method further includes, before transmitting capability information, transmitting, to the first wireless communication node, by the second wireless communication node, an indication that the second wireless communication node supports joint transmission. In some embodiments, the method also includes receiving, by the second wireless communication node, the data from the first wireless communication node responsive to the transmitted indication.

In some embodiments, the method further includes, before performing joint transmission, receiving, by the second wireless communication node from the first wireless communication node, data for the joint transmission to the wireless communication device. In some embodiments, the capability information comprises at least one of a data buffering capacity of the second wireless communication node, an access category or priority of buffered data supported by the second wireless communication node, or traffic identification information.

In some embodiments, the method also includes receiving, by the second wireless communication node from the first wireless communication node, an identification of a set of frequency bands or channels to support the joint transmission. In some embodiments, the method also includes negotiating, by the second wireless communication node with the first wireless communication node, a period during which the joint transmission is supported. In some embodiments, the method also includes receiving, by the second wireless communication node from the first wireless communication node, the notification frame including at least one of a transmission start time, an identifier of the wireless communication device, or a sequence number related to a traffic identifier associated with the data.

In some embodiments, the method further includes transmitting, by the second wireless communication node, the data received from the first wireless communication node to the wireless communication device according to at least one of the transmission start time, an identifier of the wireless communication device, or a sequence number related to a traffic identifier received from the first wireless communication node. In some embodiments, the method further includes suspending, by the second wireless communication node, contention parameters of the second wireless communication node from the beginning of the transmission until an end of transmission of the data to the wireless communication device. In some embodiments, the method further includes resuming, by the second wireless communication node, the contention parameters of the second wireless communication node after transmission of the data to the wireless communication device.

In some embodiments, the contention parameters include at least one of a value of a contention window or a value of a back-off counter. In some embodiments, at least one of the first wireless communication node, the second wireless communication node, and the wireless communication device implements an IEEE 802.11 wireless local area network protocol. In some embodiments, the contention parameters are associated with an access category of data to be sent to an associated wireless communication device of the second wireless communication node. The associated wireless communication device can be different from the wireless communication device.

In one embodiment, a method includes receiving, by a second wireless communication node from a first wireless communication node, a notification frame. The method further includes performing joint transmission, by the second wireless communication node to a wireless communication device according to the notification frame received from the first wireless communication node. The method also includes suspending, by the second wireless communication node, contention parameters of the second wireless communication node at the beginning of the transmission to the wireless communication device.

In some embodiments, the method further includes receiving, by the first wireless communication node from the second wireless communication node, before performing joint transmission, capability information of the second wireless communication node for joint transmission. In some embodiments, the capability information includes at least one of a data buffering capacity of the second wireless communication node, an access category or priority of buffered data supported by the second wireless communication node, or traffic identification information. In some embodiments, the notification frame includes at least one of a transmission start time, an identifier of the wireless communication device, or a sequence number related to a traffic identifier associated with the data. In some embodiments, the method further includes transmitting, by the first wireless communication node to the second wireless communication node, an identification of a set of frequency bands or channels to support the joint transmission.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A computer-implemented method, comprising:
receiving, by a second wireless communication node from a first wireless communication node, a notification frame;
receiving, by the second wireless communication node from the first wireless communication node, data to be transmitted to a wireless communication device;
performing a joint transmission, by the second wireless communication node with the first wireless communication node, a joint transmission of the data to the wireless communication device, according to the notification frame received from the first wireless communication node;
receiving, by the second wireless communication node from the first wireless communication node, an identification of a set of frequency bands or channels to support the joint transmission; and
suspending, by the second wireless communication node, based on a transmission start time specified in the notification frame, a back-off counter by keeping a value of the back-off counter constant, wherein the back-off counter is associated with a plurality of access category queues of a transmission buffer storing the data to be transmitted by the second wireless communication node at a beginning of the joint transmission to the wireless communication device.

2. The method of claim 1, comprising:
before performing the joint transmission, transmitting, by the second wireless communication node to the first wireless communication node, capability information of the second wireless communication node for the joint transmission.

3. The method of claim 2, comprising:
before transmitting the capability information, transmitting, to the first wireless communication node by the second wireless communication node, an indication that the second wireless communication node supports the joint transmission.

4. The method of claim 2, wherein the capability information comprises at least one of: a data buffering capacity of the second wireless communication node, an access category or priority of buffered data supported by the second wireless communication node, or traffic identification information that classifies a packet carrying data between the first wireless communication node and the second wireless communication node.

5. The method of claim 1, comprising:
before performing the joint transmission, receiving, by the second wireless communication node from the first wireless communication node, data for the joint transmission to the wireless communication device.

6. The method of claim 5, wherein:
the notification frame comprises at least one of a transmission start time, an identifier of the wireless communication device, or a sequence number related to a traffic identifier associated with the data.

7. The method of claim 5, comprising:
transmitting, by the second wireless communication node, the data received from the first wireless communication node to the wireless communication device according to at least one of a transmission start time, an identifier of the wireless communication device, or a sequence number related to a traffic identifier received from the first wireless communication node.

8. The method of claim 5, comprising:
receiving, by the second wireless communication node, the data from the first wireless communication node responsive to an indication that the second wireless communication node supports the joint transmission.

9. The method of claim 5, wherein the back-off counter is associated with an access category of the data.

10. The method of claim 1, comprising:
negotiating, by the second wireless communication node with the first wireless communication node, a period of time during which the joint transmission is supported.

11. The method of claim 1, comprising:
suspending, by the second wireless communication node, the back-off counter by keeping the value of the back-off counter constant from the beginning of the transmission until an end of the joint transmission to the wireless communication device.

12. The method of claim 1, comprising:
resuming, by the second wireless communication node, the back-off counter after the joint transmission to the wireless communication device.

13. The method of claim 1, wherein at least one of the first wireless communication node, the second wireless communication node, or the wireless communication device implements an IEEE 802.11 wireless local area network protocol.

14. A computer-implemented method, comprising:
receiving, by a first wireless communication node from a second wireless communication node, an indication that the second wireless communication node supports a joint transmission to a wireless communication device;
transmitting, by the first wireless communication node to the second wireless communication node, a notification frame,
wherein the notification frame causes the second wireless communication node, based on a transmission start time specified in the notification frame, to suspend a back-off counter by keeping a value of the back-off counter constant, wherein the back-off counter is associated with a plurality of access category queues of a transmission buffer storing data to be transmitted by the second wireless communication node at a beginning of the joint transmission to the wireless communication device;
transmitting, by the first wireless communication node to the second wireless communication node, data to be transmitted to the wireless communication device;
performing, by the first wireless communication node with the second wireless communication node, the joint transmission of the data to the wireless communication device; and
transmitting, by the first wireless communication node to the second wireless communication node, an identification of a set of frequency bands or channels to support the joint transmission.

15. The method of claim 14, comprising:
before performing the joint transmission, receiving, by the first wireless communication node from the second wireless communication node, capability information of the second wireless communication node for the joint transmission.

16. The method of claim 15, wherein:
the capability information includes at least one of: a data buffering capacity of the second wireless communication node, an access category or priority of buffered data supported by the second wireless communication node, or traffic identification information that classifies a packet carrying data between the first wireless communication node and the second wireless communication node.

17. The method of claim 14,
wherein the notification frame includes at least one of a transmission start time, an identifier of the wireless communication device, or a sequence number related to a traffic identifier associated with the data.

18. The method of claim 14, comprising:
transmitting, by the first wireless communication node to the second wireless communication node, an identification of a set of frequency bands or channels to support the joint transmission.

* * * * *